United States Patent

[11] 3,629,786

| [72] | Inventors | Frank L. Reynolds<br>Monroe;<br>Alfred C. Langer, Brookfield; Ellsworth<br>Tweedie, Milford, all of Conn. |
|---|---|---|
| [21] | Appl. No. | 70,655 |
| [22] | Filed | Sept. 9, 1970 |
| [45] | Patented | Dec. 21, 1971 |
| [73] | Assignee | Frigitronics of Conn., Inc.<br>Shelton, Conn. |

[54] COMBINATION CONNECTOR
10 Claims, 4 Drawing Figs.

[52] U.S. Cl................................................. 339/16 R,
128/2 R, 339/183
[51] Int. Cl........................................................ H01r 3/04
[50] Field of Search............................................ 339/15, 16,
35, 112, 117, 118, 182, 183; 174/21, 22, 47;
73/420; 128/2 R, 2.05

[56] References Cited
UNITED STATES PATENTS
| 2,542,536 | 2/1951 | Kirksey | 339/16 R |
| 2,864,628 | 12/1958 | Edleson | 339/16 |
| 3,082,394 | 3/1963 | Hahn et al. | 339/16 R |
| 3,195,095 | 7/1965 | Field | 339/16 R |

*Primary Examiner*—Marvin A. Champion
*Assistant Examiner*—Robert A. Hafer
*Attorney*—Buckles and Bramblett

ABSTRACT: There is disclosed a separable connector for both gas and electricity. It comprises a panel-mounted female member having an electrically conductive socket containing a reciprocable spring-loaded valve member. The valve member has a first position in which it shuts off gas flow and makes an electrical connection with the socket, and a second position which permits gas flow and wherein it is electrically isolated from the socket. External electrical connections are made to both the socket and the valve member. A male member includes a probe which may be inserted into the socket to make an electrical connection therewith. The probe carries an actuating member which is electrically isolated from the probe body. Upon insertion of the probe into the socket, the actuating member actuates the valve from its first to its second position and simultaneously makes electrical contact therewith. Electrical connections may be made to the probe body and to the actuating member.

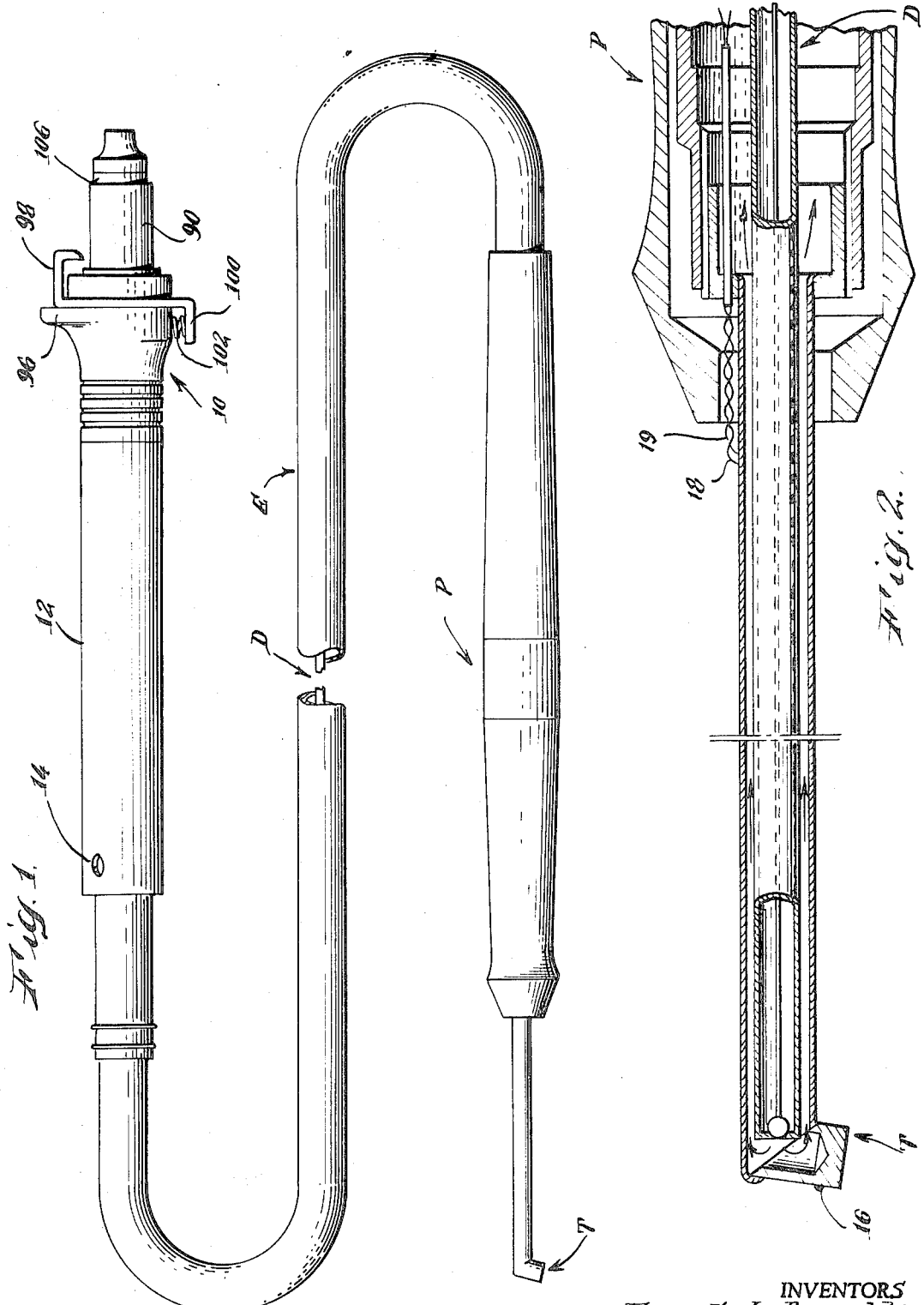

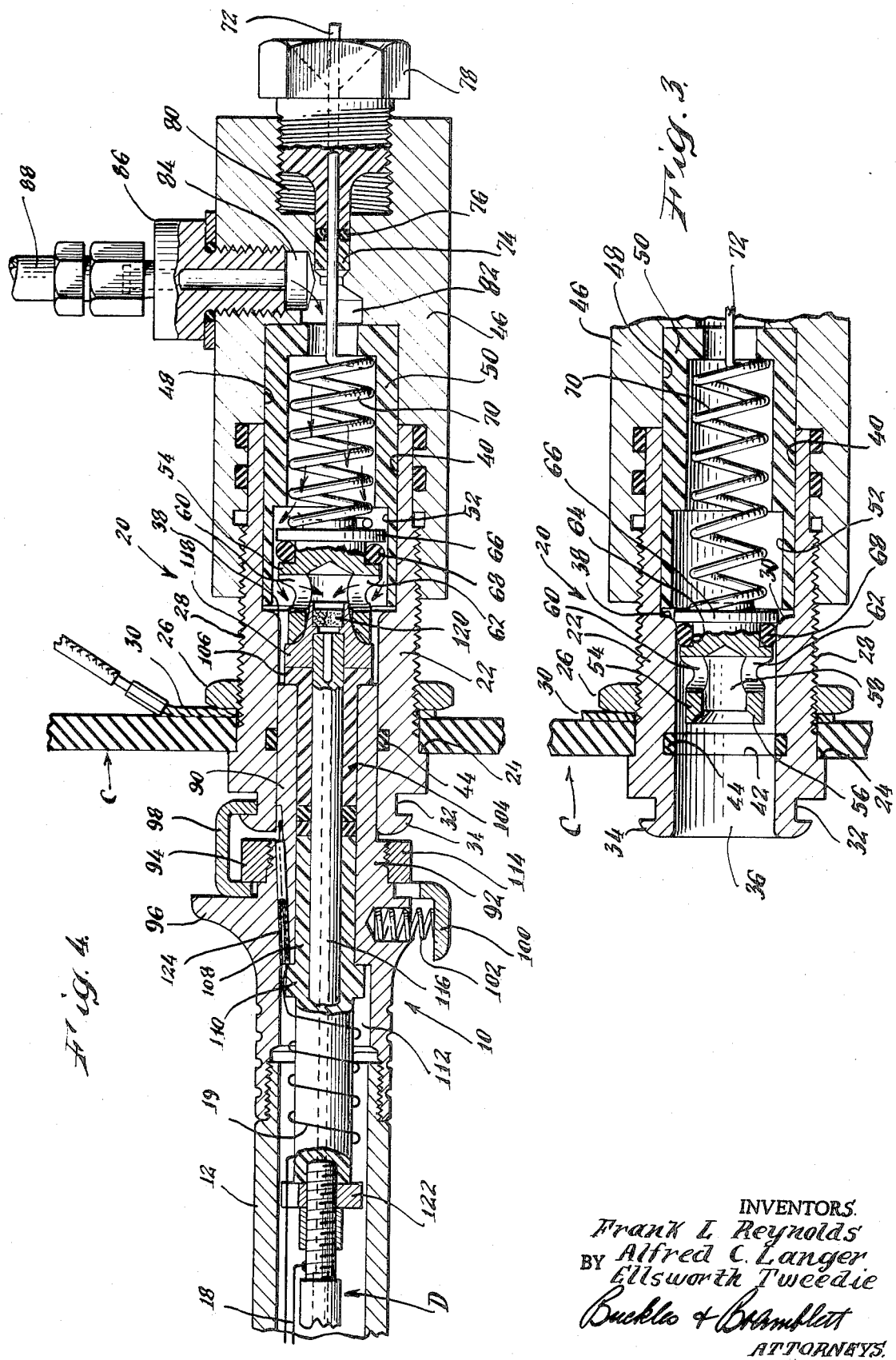

COMBINATION CONNECTOR

BACKGROUND OF THE INVENTION

Cryosurgical instruments are being used in more and more surgical procedures. The more sophisticated of these instruments are small and light and may be rapidly cooled to cryogenic temperatures or warmed to room temperature as desired by the surgeon. Such an instrument may comprise a probe which receives cryogenic fluid through a delivery line. The fluid may be either a low boiling liquid or a high pressure gas. The former cools by boiling in the probe tip, the latter by Joule-Thomson expansion. In both, the resulting exhaust is passed either to atmospheric or to a vacuum system.

The fluid which is delivered to the instrument is secured from a supply cabinet through a flexible delivery tube. A connector permits the tube to be readily attached and detached from the supply cabinet.

It is essential that the surgeon know the probe temperature at all times. For this reason, the probe tip is normally provided with a thermocouple junction. For convenience, the temperature is normally monitored at the supply cabinet. Accordingly, an electrical connector is usually provided on the cabinet for connecting the thermocouple leads.

It is the primary object of the present invention to effect simplification by providing a detachable connector which functions both as a fluid connector and as an electrical connector.

Another object is to provide a connector wherein the temperature meter is shorted when not in use.

Other objects, features and advantages will be apparent from the following description and appended claims.

SUMMARY OF THE INVENTION

There is provided a separable connector for both fluid and electricity which comprises a female member and a male member. The female member includes an electrically conductive socket which defines a fluid flow passage. It includes means for making a first electrical connection to the socket. An electrically conductive valve within the socket has a first position which normally closes the fluid flow passage and simultaneously makes electrical contact with the socket and a second position which opens the fluid flow passage and breaks the electrical contact. Means are also provided for making a second electrical connection to the valve. The male member includes an electrically conductive probe which is insertable into the socket to make an electrical connection thereto and means are provided for making a third electrical connection to the probe. The probe carries an electrically conductive actuating member which is electrically insulated from the probe and defines a fluid discharge passage. The actuating member is positioned to electrically contact the valve member and simultaneously displace it to its second position. Means are provided for making a fourth electrical connection to the actuating member.

BRIEF DESCRIPTION OF THE DRAWING

A preferred embodiment of this invention is illustrated in the drawings wherein:

FIG. 1 illustrates a cryosurgical probe, associated delivery-exhaust tube and male connector member;

FIG. 2 is an enlarged cross section of the probe tip illustrating the thermocouple connection;

FIG. 3 is an enlarged cross section of a portion of the female connector in its normally closed position; and FIG. 4 is an enlarged cross section illustrating the mated male and female connectors.

DESCRIPTION OF THE PREFERRED EMBODIMENT

With particular reference to the drawings, there is illustrated in FIG. 1 a cryosurgical probe P connected by means of coaxial exhaust tube E and inner delivery tube D to a male connector member 10. Secured to male connector member 10 is an elongated housing 12 which defines exhaust ports 14.

The illustrated cryosurgical probe operates on the principle of Joule-Thomsom expansion. Although its operation will not be described in detail, it will be apparent from FIG. 2 that high pressure gas from delivery tube D is expanded into probe tip T and then exits rearwardly to the exhaust tube E as shown by the arrows. In order to monitor the temperature of probe tip T, there is provided a welded thermocouple 16 formed between copper wire 18 and constantan wire 19.

Turning now to FIGS. 3 and 4, there will first be described the female connector member 20 which is fixedly secured to the front panel of a supply cabinet C. Female connector member 20 comprises an electrically conductive socket 22 of generally cylindrical configuration. It is mounted in an opening in cabinet C by means of a shoulder 24 and a nut 26 on a threaded intermediate portion 28. The nut 26 also retains an electrical terminal 30 in electrical contact with the socket. The forward end of the socket 22 defines an annular recess 32 terminating in a locking flange 34. The socket 22 is bored to form a forward passage 36 which terminates at an annular shoulder 38 marking the forward end of a larger recess 40. The passage 36 also defines near its forward end an annular recess 42 which carries a sealing O-ring 44.

Screwed to the rear of socket 22 is a generally cup-shaped housing 46 which defines a cavity 48. Mounted within this cavity and extending forwardly into the recess 40 is an electrically insulating spring housing 50. The forward end of spring housing 50 defines a cavity 52 which is substantially cylindrical in cross section and has a diameter slightly larger than that of passage 36. Mounted in passage 36 is an electrically conductive valve member 54. The forward end of valve member 54 defines a conical socket 56 which communicates with the axial bore 58. The sides of valve member 54 are pierced by transverse passages 60, 62. The rearward end of valve member 54 defines a circular recess 64 terminating in a radial flange 66. The diameter of flange 66 is greater than that of passage 36 and, in the normally closed position illustrated in FIG. 3, it contacts shoulder 38. O-ring 68, contained within recess 64, has a diameter such that it may be readily forced into passage 36 to maintain sealing engagement there with. The valve member 54 is retained in its normally closed position by means of a coil spring 70 within spring housing 50.

Spring 70 terminates in an elongated tail 72 which passes outwardly of housing 46 through an axial clearance bore. It is centered in the bore by means of an electrically insulating cylindrical spring guide 74, an O-ring 76, and a retaining screw 78 threaded into a recess 80 in the rear of housing 46. It will be noted that an axial passage 82 is formed in the female member 20 which extends forwardly from the spring guide 74 through the spring housing 50 to the seal formed between the O-ring 68 and flange 66 of the valve member 54 with passage 36. Communicating with passage 82 is a transverse bore 84 which is threaded to receive a gas supply fitting 86. HIgh-pressure gas is supplied to this fitting via conduit 88 from a remote source (not shown).

Male member 10 comprises an electrically conductive hollow cylindrical probe 90 of a size to slide snugly into passage 36 of female member 20. The probe carries a threaded flange 92 upon which is mounted a retaining nut 94. Between nut 94 and a second spaced flange 96 is mounted a latch 98 for engaging locking flange 34. Latch 98 includes a trigger 100 biased downwardly by means of a coil spring 102. Carried within the hollow probe 90 is a forward insulating tube 104 having a flange 106 which engages the forward end of probe 90. A second insulating tube 108 enters the tube from the rear and, by means of a shoulder 110, is seated in a recess 112. Insulating tubes 104 and 108 are separated by a pair of O-rings 114. Passing through the insulating tubes 104, 108 is an electrically conductive tubular actuating member 116. The forward end of actuating member 116 terminates at a conductive bell-shaped nose piece 118 which defines an opening carrying a sintered metal gas filter 120. The opposite end of actuating member 116 is threaded and the parts of the probe are maintained in position by means of a nut 122. The copper thermocouple wire 18 is soldered to the threaded end of actuating member 116. The constantan wire 19 is wrapped around insulating tube 108, is led through a passage 124, and its end is soldered to probe 90.

The terminal 30, which is electrically connected to socket 22, and the tail 72 of spring 70 are connected to the temperature meter. FIG. 3 illustrates the female member prior to connection of the male member. It will be noted that the only electrical connection between the spring 70 and socket 22 arises from the contact between the flange 66 of member 54 and the shoulder 38. This creates a short circuit across the meter when it is not in operation. At the same time, it will be noted that the O-ring 68 and the flange 66 effectively shut off the flow of gas entering from conduit 88.

Upon insertion of the male member 10, the nose piece 118 contacts valve member 54 and forces it rearwardly against the force of spring 70 to the position illustrated in FIG. 4. This has two effects. First, it permits the high pressure gas to flow around the flange 66 and O-ring 68, through passages 60, 62, filter 120, and the tubular actuating member 116, to delivery tube D and thence to the surgical instrument. At the same time, the copper thermocouple wire 18 makes contact with one side of the meter through the actuating member 116, nose piece 118, valve member 54, spring 70 and its tail 72. The constantan wire 19 is connected to the other side of the meter through probe 90, socket 22 and terminal 30.

It will be apparent that many variations and modifications may be made in this invention. For example, the constantan wire 19 is shown wrapped around insulating tube 108. This is simply a length adjustment for calibration and may be varied or omitted to suit the circumstances. As a further modification, the electrically conductive parts of the connector may be made of appropriate thermoelectric materials, such as copper and constantan, to form a fully compensated system. Other variations and modifications will also present themselves to those skilled in the art. Accordingly, the foregoing description is to be construed as illustrative only, rather than limiting. This invention is limited only by the scope of the following claims.

We claim:

1. A separable connector for both fluid and electrically which comprises: a female member including an electrically conductive socket defining a fluid flow passage therethrough, means for making a first electrical connection to said socket, an electrically conductive valve member having a first position opening said fluid flow passage, and means for making a second electrical connection to said valve member; and a male member including an electrically conductive probe insertable into said socket to make an electrical connection thereto, means for making a third electrical connection to said probe, an electrically conductive actuating member carried by said probe and electrically insulated therefrom and defining a fluid discharge passage therethrough, said actuating member being positioned to electrically contact said valve member and simultaneously displace it to its second position, and means for making a fourth electrical connection to said actuating member.

2. The connector of claim 1 wherein said socket and valve make electrical contact in said first position and break electrical contact in said second position.

3. The connector of claim 1 wherein said valve member is mounted within said socket for axial movement between said first and second position.

4. The connector of claim 1 wherein said socket encloses an electrically insulating housing positioned to substantially encircle said valve member when in its second position.

5. The connector of claim 4 wherein said second electrical connection means comprises a spring position in said housing and resiliently urging said valve member to its first position.

6. The connector of claim 1 wherein said actuating member comprises a tube enclosed by, and coaxial with, said probe and an electrically insulating tubular spacer therebetween.

7. The connector of claim 6 wherein said tube extends from the end of said probe and includes a nose piece positioned to engage said valve member upon insertion of said probe into said socket.

8. A female connector member for both fluid and electricity which comprises: an electrically conductive socket defining a fluid flow passage therethrough; means for making a first electrical connection to said socket; an electrically conductive valve member having a first position normally closing said fluid flow passage and simultaneously making electrical contact with said socket and a second position opening said fluid flow passage and breaking said electrical contact; and means for making a second electrical connection to said valve member.

9. The member of claim 8 wherein said socket includes an electrically insulating housing positioned to substantially circle said valve member when in its second position, and said second electrical connection means comprises a spring positioned in said housing and resiliently urging said valve member to its first position.

10. A male connector member for both fluid and electricity which comprises: an electrically conductive probe; means for making a first electrical connection to said probe; an electrically conductive tubular actuating member enclosed by, and coaxial with, said probe and defining a fluid passage therethrough; an electrically insulating tubular spacer intermediate said probe and actuating member; and means for making a second electrical connection to said actuating member.

* * * * *

UNITED STATES PATENT OFFICE
CERTIFICATE OF CORRECTION

Patent No. 3,629,786               Dated December 21, 1971

Inventor(s) Frank L. Reynolds, Alfred C. Langer & Ellsworth Tweedie

It is certified that error appears in the above-identified patent and that said Letters Patent are hereby corrected as shown below:

Column 1, line 14, change "atmospheric" to --atmosphere--.
Column 2, line 2, change "Thomsom" to --Thomson--; line 31, change "the" to --an--.  Claim 1, line 39, change "electrically" to --electricity--; between lines 43 and 44 insert --normally closing said fluid flow passage and a second position--.
Claim 5, line 16, change "position" to --positioned--.  Claim 9, lines 36 and 37, change "circle" to --encircle--.

Signed and sealed this 13th day of June 1972.

(SEAL)
Attest:

EDWARD M. FLETCHER, JR.                ROBERT GOTTSCHALK
Attesting Officer                      Commissioner of Patents